United States Patent
Kinch (10) Patent No.: US 9,171,481 B2
(45) Date of Patent: Oct. 27, 2015

(54) METHOD FOR IDENTIFYING, DISPLAYING, SELECTING, NAMING AND MATCHING COLORS

(71) Applicant: Nicoline Kinch, Stockholm (SE)

(72) Inventor: Nicoline Kinch, Stockholm (SE)

(*) Notice: Subject to any disclaimer, the term of this patent is extended or adjusted under 35 U.S.C. 154(b) by 223 days.

(21) Appl. No.: 13/935,588

(22) Filed: Jul. 5, 2013

(65) Prior Publication Data

US 2015/0010888 A1  Jan. 8, 2015

Related U.S. Application Data (63) Continuation-in-part of application No. 12/985,369, filed on Jan. 6, 2011, now Pat. No. 8,558,843.

(60) Provisional application No. 61/377,193, filed on Aug. 26, 2010.

(51) Int. Cl.
*G09B 19/00* (2006.01)

(52) U.S. Cl.
CPC ................................. *G09B 19/0023* (2013.01)

(58) Field of Classification Search
CPC ......... G09G 5/02; G09G 5/06; G09G 3/2003; G06T 11/001; H04N 9/64; G06F 3/0486; G06F 5/04; G06Q 30/02; G01J 3/522; G01J 3/528; G01J 3/52; G09B 19/0023
See application file for complete search history.

(56) References Cited

U.S. PATENT DOCUMENTS

| | | | | |
|---|---|---|---|---|
| 418,146 | A * | 12/1889 | Turner | 434/104 |
| 640,792 | A | 1/1900 | Munsell | |
| 2,184,125 | A * | 12/1939 | Patterson | 434/104 |
| 2,238,316 | A * | 4/1941 | Gaugler | 434/104 |
| 4,169,285 | A * | 9/1979 | Walker | 345/591 |
| 4,377,286 | A | 3/1983 | Constantinescu | |
| 4,695,832 | A | 9/1987 | Jacobson | |
| 4,865,323 | A | 9/1989 | Heusinkveld | |
| 5,026,286 | A * | 6/1991 | Hellwig | 434/98 |
| 6,139,325 | A * | 10/2000 | Tracy et al. | 434/104 |
| 6,518,948 | B1 | 2/2003 | Berstis | |
| 6,924,817 | B2 | 8/2005 | Rice et al. | |
| 7,180,524 | B1 | 2/2007 | Axelrod | |
| 7,221,373 | B2 | 5/2007 | Dornan et al. | |
| 8,681,171 | B2 * | 3/2014 | Kinch | 345/593 |
| 2012/0050311 | A1 * | 3/2012 | Kinch | 345/594 |

FOREIGN PATENT DOCUMENTS

WO  2009034401  3/2009

OTHER PUBLICATIONS

Munsell Color System; 1994; Encyclopedia Britannica; http://www.britannica.com/EBchecked/topic/397642/Munsell-colour-system.*

* cited by examiner

*Primary Examiner* — Xiao Wu
*Assistant Examiner* — Todd Buttram
(74) *Attorney, Agent, or Firm* — Fasth Law Offices; Rolf Fasth (57) ABSTRACT

The color device has a core with hues that gradually change whiteness, respectively. The discs have hues covering an entire color spectrum at a certain level of whiteness. All hues of the first and second discs have the first and second level of whiteness, respectively. The discs extend perpendicularly outwardly from the core. The first disc is axially remote from the second disc so that a distance (d) is formed therebetween. The discs are aligned so that color cells of the first disc axially aligned with color cells of the second disc have identical hues except for different whiteness. The level of color saturation in the color cells is gradually increased radially outwardly from the core.

6 Claims, 5 Drawing Sheets

METHOD FOR IDENTIFYING, DISPLAYING, SELECTING, NAMING AND MATCHING COLORS

PRIOR APPLICATIONS

This application is a Continuation-In-Part patent application that claims priority from Continuation-In-Part patent application Ser. No. 13/007,076, filed 14 Jan. 2011 that claims priority from U.S. Utility patent application Ser. No. 12/985,369, filed 6 Jan. 2011 that claims priority from U.S. Provisional Patent Application Ser. No. 61/377,193, filed 26 Aug. 2010.

TECHNICAL FIELD

The invention relates to a method for identifying, displaying, selecting, naming and matching colors.

BACKGROUND OF INVENTION

Most people find it difficult to understand how colors relate to each other and identify and match colors. In schools, teachers find it difficult to make the students understand how colors relate. Another example is stores that sell paint have two-dimensional color maps that show many color shades from which the customers must select colors. However, it is difficult for customers to know why, for example, yellow appears on several different color samples and what the difference is between these different "yellows", why a color in one color map matches a second color in a different color map. An often expressed problem among vendors of paint is that the customer has a tendency to choose colors that are too intense. They realize the mistake afterwards, when the paint has already been applied. No system is effective and it is difficult for people to match colors and understand how colors related to one another despite the various prior efforts.

SUMMARY OF INVENTION

The method of the present invention provides a solution to the above-outlined problems. More particularly, the method is a three-dimensional method for identifying, selecting and matching colors. It can be virtual as well as physical. With the help of a system of coordinates, any shade can be identified. The color sphere has a plurality of organized color cells so that the top of the sphere is white and the bottom is black. The most intense color shades of blue, yellow and red are disposed around the "equator" of the sphere. These three colors form a triangle when seen from above. The sphere may be cut in any way desired since all colors in the interior of the sphere are also organized so that they relate to each other. Towards the core the color shades become more grayish color shades while the color shades closer to the periphery of the sphere are gradually less gray. An axis through the sphere extends from the white top to the black bottom so that the shades therebetween gradually changes from white to various gray color shades that get darker until it is black. The sphere may be treated as having a plurality of color cells that gradually get lighter from a bottom to a top of the sphere and more gray as the color cells are disposed closer to the core axis of the sphere.

In operation, a first color cell may be selected from the color sphere. A radial direction, a horizontal peripheral direction and a vertical peripheral direction are identified relative to the first color cell. The color cells of the color sphere match in the radial, the horizontal peripheral and the vertical peripheral directions. A second color cell is selected when the second color cell is in selected direction. The color sphere is openable to display color cells disposed inside the sphere.

Additionally, the method is for identifying and selecting a color or a combination of colors. A color sphere is provided that has a first color pocket defined between a first horizontal disc and a second horizontal disc and vertical inserts extending between the first horizontal disc and the second horizontal disc. The first horizontal disc has a plurality of organized first spectrum of color cells and the second horizontal disc has a plurality of organized second spectrum of color cells. When disposed more towards the "north pole", the first spectrum is gradually whiter than the second spectrum and gradually more gray from a peripheral surface towards an axial opening of the first horizontal disc and an axial opening of the second horizontal discs. A first color cell is identified in a first pocket.

The spherical color device of the present invention has a central elongate core that has hues that gradually change whiteness from black at a first end to white at second end. In the preferred embodiment, the whiteness generally increases from the "south pole" towards the "north pole" of the sphere. Also, the color saturation or purity or relative departure from neutral gray generally increases from the core towards the periphery of the sphere so that the hues are less saturated towards the core, which make them more grayish, and the hues at the periphery has a complete absence of neutral gray so that the colors are more pure at the periphery of the spherical device. An important feature of the present invention is that the color saturation does not increase radially in all directions from a central point of the spherical device. Instead, the color saturation increases radially and perpendicularly from the core axis. This means that discs or segments that are axially removed or remote from the mid-segment or the equatorial segment are organized in the same way i.e. the color saturation increases in the radial and perpendicular direction of the core axis. Preferably, this also means that color cells that are axially aligned have the same color saturation although they are located on different discs or segments.

A first round foldable disc is attached to a first position of the core wherein the first position has a first level of whiteness. The first disc has color cells with hues covering a color spectrum of a certain level of whiteness. The hues of the first disc have the first level of whiteness. A second foldable disc is attached to a second position of the core wherein the second position has a second level of whiteness. The second disc has color cells with hues covering a color spectrum of the second level of whiteness. The first disc and the second disc extend perpendicularly outwardly from the core axis. The first disc is axially remote from the second disc so that a distance (d) is formed therebetween. The first disc and the second disc are aligned so that color cells of the first disc are axially aligned with color cells of the second disc so that all the hues in the axial or vertical direction have the same hues except for a difference in the level of whiteness. Another important feature is that the first disc and the second disc have the color cells arranged so that a level of color saturation in the color cells is gradually increasing radially outwardly in a perpendicular direction from the core. This means the color saturation is the lowest immediately adjacent to the core and the highest remotely from the core i.e. at the periphery of the sphere. Preferably, each color cell has a consistent level of color saturation within the color cell. In other words, the hue within a color cell does not change but is consistent throughout the color cell. This means each color cell has a consistent whiteness within the color cell. However, it should be understood that it is also possible to vary the color saturation within a color cell, if required. Another possibility of the present invention is that the distance (d) may be such that all color cells on the upper surface of each disc are visible without moving the first disc and the second disc on the core. This means a viewer can see all the hues of the color cells when viewing the color device of the present invention. The color device may have many additional disc attached thereto such as a third disc attached to the core so that the first, second and third discs together form a spherical shape. Preferably, all the discs have a plurality of pie-shaped pieces that are slidable and foldable relative to one another. The pie-shaped pieces are sized so that they together form a circle-shaped disc when the pie-shaped pieces are placed adjacent one another. In a preferred embodiment, each disc has circular bands or rings of hues and each hue in a peripheral band has an identical level of color saturation.

DETAILED DESCRIPTION

Figure 1:
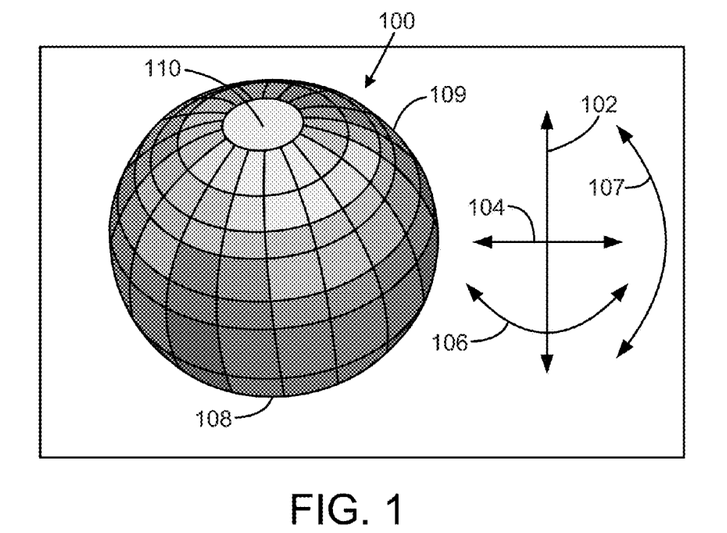
FIG. 1 is a schematic illustration of a portion of a color sphere of the present invention.

With reference to FIG. 1, the color sphere 100 of the present invention has a plurality of color cells or color shades that are organized. The color sphere 100 may also be virtual so that the user can easily "open up" the sphere to go inside the sphere by using a computer program. In this way, the user may effortlessly move inside the sphere to search for and identify the desired color shades. Preferably, the color cells are based on and organized according to three or triangular based colors namely yellow, red and blue. The change of the color change may also be continuous so that distinct color cells cannot be seen. The color sphere may be taken apart so that color cells disposed inside the sphere 100 are visible also. The sphere 100 has a peripheral surface 109 and all the visible colors organized in an axial direction 102, a radial direction 104, a horizontal peripheral direction 106 and a vertical peripheral direction 107. The color shades get lighter from a bottom 108 towards a top 110 of the sphere 100. An important and surprising realization or insight of the present invention is that colors match or are in harmony when they are disposed along the axial direction 102, the radial direction 104, the horizontal peripheral direction 106 and the vertical peripheral direction 107 relative to one another but not in any other direction. In other words, the color cells are organized in the sphere 100 so that by selecting one color shade the user may find another matching color shade by simply moving in the axial direction 102, the radial direction 104, the horizontal peripheral direction 106 or the vertical peripheral direction 107 to select another color shade in order to identify a color shade that matches the first selected color shade. It is of course also possible to find colors that are not in harmony with or match one another by using directions other than the directions 104, 106 and 107.

Figure 2:
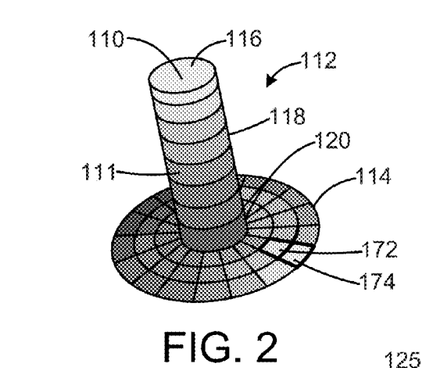
FIG. 2 is a schematic perspective top view of an axial portion of the color sphere of the present invention.

FIG. 2 is a perspective top view of an axial portion 112 including the core 111 of the sphere 100 that includes a bottom 114. The color shades of the axial portion 112 are organized so that they gradually change from a white shade 116 at the top 110 via gray shades 118 to a black shade 120 at the bottom 108 of the axial portion 112.

Figure 3:
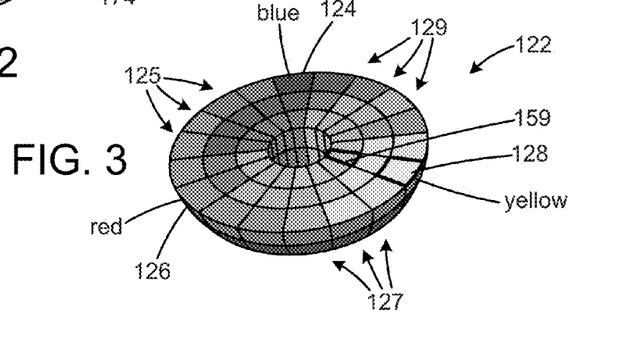
FIG. 3 is a schematic perspective top view of a lower segment of the color sphere of the present invention.

FIG. 3 is a perspective top view of a lower segment 122 disposed close to the bottom of the sphere 100 but above the bottom 114 shown in FIG. 2. The lower segment 122 has many color cells including a cell of a blue shade 124 and the color cells gradually change to a red shade 126 that gradually change to a yellow shade 128 along the horizontal peripheral direction 106. Similarly, the cells between the yellow shade 128 gradually change from the yellow shade 128 to the blue shade 124 in the direction 106. In this way, the color cells between the blue shade 124 and the yellow shade 128 are various shades of greenish colors 129 and the color cells between the blue shade 124 and the red shade 126 are various shades of purplish colors 125. Similarly, the color cells between the red shade 126 and the yellow shade 128 are various shades of orange colors 127. The colors between the orange and the black are various shades of brown. The same principle applies to color cells disposed closer to the core 111 in that they consists of more and more gray. The only difference of the color shades of the color cells between the visible top layer and the layers below the top layer is that the color shades in the lower levels are gradually darker as the layers get closer to the bottom black 114.

Figure 4:
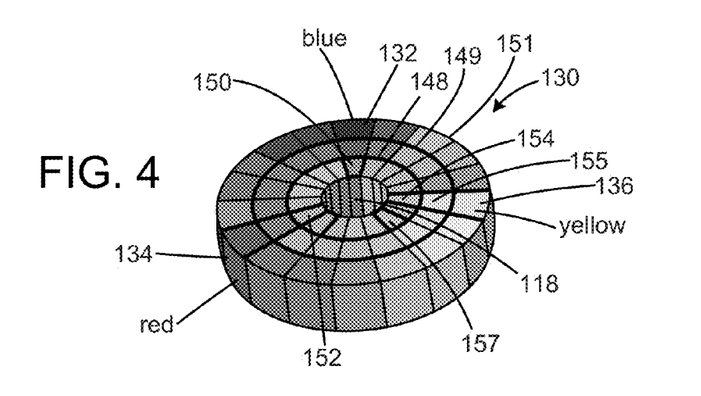
FIG. 4 is a schematic perspective top view of a mid-segment of the color sphere of the present invention.

FIG. 4 is a perspective top view of mid-segment 130. The outer periphery or the "equator" of the sphere 100 has the most intense colors. Similar to the bottom segment 122, the mid-segment 130 has many color cells including a blue shade 132, red shade 134 and a yellow shade 136. The blue shade 132 is slightly lighter than the blue shade 124 of the bottom segment 122 since the shades gradually change from darker shades at the bottom 108 to lighter shade at the top 110 of the entire sphere 100. The red shade 134 is therefore slightly lighter than the red shade 126 and the yellow shade 136 is slightly lighter than the yellow shade 128 of bottom segment 122. The inner wheel-shaped segment 148 has more of gray color shades than does the color shade in cell 149. However, the color shade 150 is a grayish/bluish shade because the peripheral cell 132 is blue. The color shade 152 includes a reddish gray because the peripheral cell 134 is red. Similarly, the color shade 154 includes a yellowish shade because the peripheral cell 136 is yellow. The same principle applies to all the color cells in the other segments such as the middle wheel-shaped segment 149 and the outer peripheral wheel-shaped segment 151. All horizontal peripheral "wheels" 106, such as like cells 149, 151 and 163 contain the same amount of gray and therefore match each other.

All the shades in the radial direction 104 also match one another. This means, for example, that all the color shades disposed radial direction extending from the color cell 144 towards color cell 161 match one another even when extended into the purple zone of color cells disposed on the other side of the core.

Figure 5:
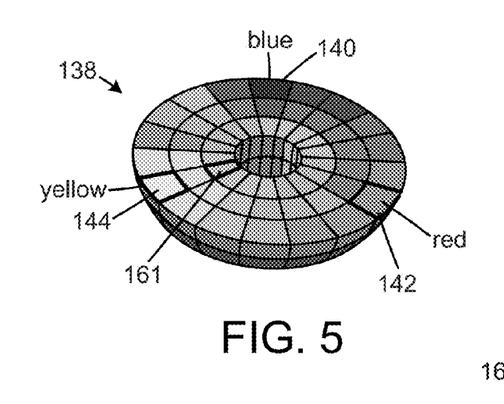
FIG. 5 is a schematic perspective bottom view of an upper segment of the color sphere of the present invention.

FIG. 5 is a bottom view of a top segment 138 that, in general, have lighter colors than the middle segment 130. The top segment 138 also has a lighter blue shade 140, a lighter red shade 142 and a lighter yellow shade 144 and various color shades therebetween, as explained above.

Figure 6:
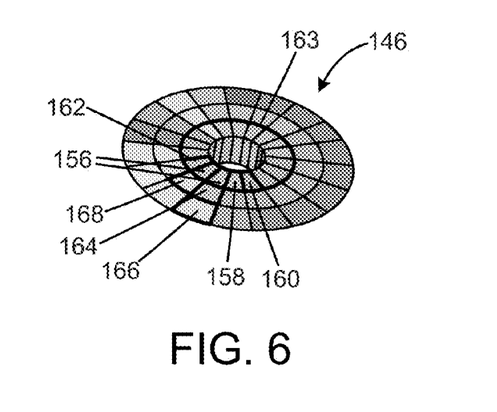
FIG. 6 is a schematic perspective bottom view of a top segment of the color sphere of the present invention.

FIG. 6 is a bottom view of a top 146 that has very light color shades but is organized in the same way as the segments 122, 130 and 138. As mentioned above, the important realization of the present invention is that certain color shades are in harmony or match while other color shades are not in harmony and that the matching colors can easily be found by moving in the directions 102, 104, 106 or 107 from the first selected color cell. For example, color cell 156 matches any other color in the peripheral direction 106 (see FIG. 1) so that color cell 156 are in harmony with and matches color cells 158, 160 and 162 and all the other color cells in the inner wheel-shaped segment 163. Color cell 156 is also in harmony color cells in the radial direction 104 (see FIG. 1) so that color cell 156 matches the color cells 164 and 166. However, color cell 156 is not in harmony with color cell 168 because color cell 168 is neither in the radial direction 104 nor in the peripheral direction 106 relative to color cell 156. It should be noted that color cell 156 is matching the corresponding cell of the top segment 138 in the vertical peripheral direction 107.

Colors are also in harmony and match one another in the axial direction 102. This means all the colors from the white shade 116 to the gray shades 118 and black shade 120 matches one another. The color shade 120 also matches, for example, all the color shades in the radial direction 104 such as color shades 172 and 174. In fact, the dark gray color shade 120 matches all the color shades in all the radial directions from the center and radially outwardly towards the periphery of the bottom 114.

In operation, the user may first select or identify color cell 154 in FIG. 4. In order to find a matching color the user may simply select any color in the radial direction 104, such as the color shade of color cell 155 or color cell 136, in the horizontal peripheral direction 106, such as color cell 157, or in the vertical peripheral direction 107, such as the yellowish color cell 159 shown in FIG. 3 or the yellowish color cell 161 shown in FIG. 5. It should be understood that any other color in the direction 104, 106 or 107 would be in harmony or match color cell 154. In this way, it is very easy for the user to select matching colors even if the colors are disposed far away from the selected color cell 154 in the sphere 100. The color sphere 100 of the present invention thus prevents the user from selecting mismatching colors i.e. color cells that are not disposed along any of the directions 102, 104, 106 or 107 relative to the first selected color shade used as the reference.

It is also possible to use the sphere 100 of the present invention as a learning tool to learn about colors and their relationships to one another. For example, it is possible to better understand what an apricot color consists of such as white plus yellow-red and how it relates to other color such as pink which may contain the same amount of white and red but no yellow. Brown may include the same amount of yellow-red and some black but no white etc. The sphere 100 may also be used as a three-dimensional puzzle wherein each piece may characterize a color shade. The pieces could be held together mechanically by fasteners or magnetism.

The sphere 100 may also be used to avoid the mistake of selecting a color that is too intense. For example, when a customer in a paint store has selected a color that, in the opinion of the sales clerk who may be more of an expert than the customer, is too intense, the sales clerk can easily recommend a color that is less intense by, for example, selecting a color in a radial inward direction. Of course, more intense colors may be selected by finding a color shade in the radial outward direction.

FIGS. 7A-7F and FIG. 8 are schematic views of an alternative embodiment. In general, the user may look inside the sphere of the alternative embodiment to see and better understand how the color shades relate to one another even when the sphere is fully assembled. The sphere provides for improved understanding and knowledge about colors and how they relate to one another. The sphere has all the color shades organized in a systematic and logical way so that the user may easily identify, select, store, compare and match colors.

The sphere may, also easily be disassembled so that the user can see and compare color shades on each disc or insertion, as explained below. The operation of the alternative embodiment is identical to the embodiment explained above except that the alternative embodiment also enables the user to find color shades inside pockets of the sphere i.e. to find color shades in directions of all the three dimensions (without having to open the sphere).

Additionally, the spectrum of color shades and the position of each color shade of the alternative embodiment is virtually identical to the embodiment shown in sphere 100. In general, as seen from above the color shades of the color spectrum of the sphere of the alternative embodiment gradually change in the clockwise direction from blue towards yellow and from yellow towards red and from red towards blue to complete the circle. Seen from the side, the color shades of the sphere gradually change from a black color at the bottom of the sphere towards a white color at the top of the sphere. The most intense colors are located at the periphery such as the "equator" of the sphere. The sphere and its components are explained in detail below. The number of discs, grooves and insertions used may be changed and the version shown in FIGS. 7-8 is only an illustrative example.

Figure 7A:
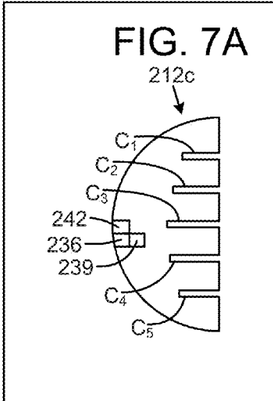
FIG. 7a is a side view of a vertical insertion of the present invention.
Figure 7B:
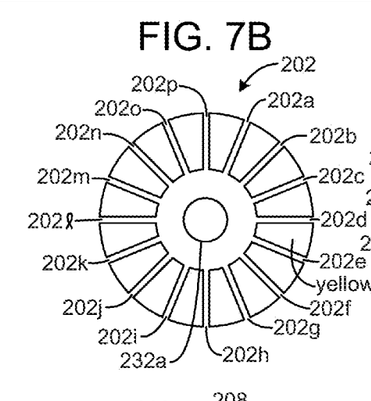
FIG. 7b is a top view of a horizontal disc of the present invention.
Figure 7C:
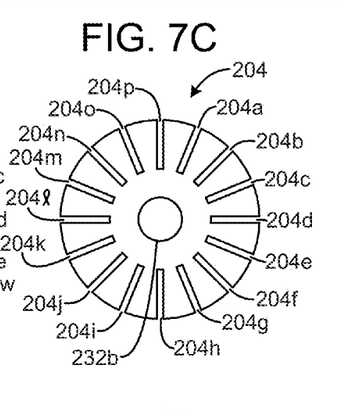
FIG. 7c is a top view of a horizontal disc of the present invention.
Figure 7D:
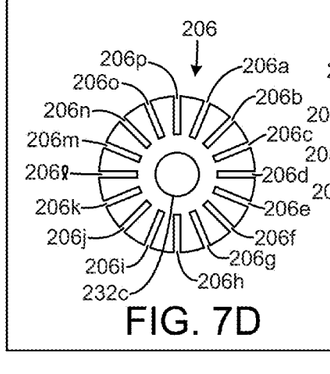
FIG. 7d is a top view of a horizontal disc of the present invention.
Figure 7E:
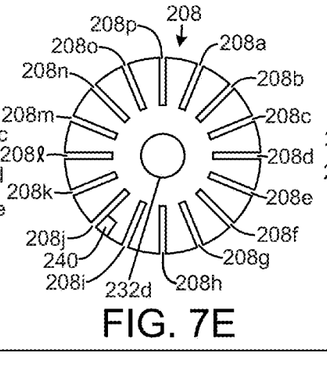
FIG. 7e is a top view of a horizontal disc of the present invention.
Figure 7F:
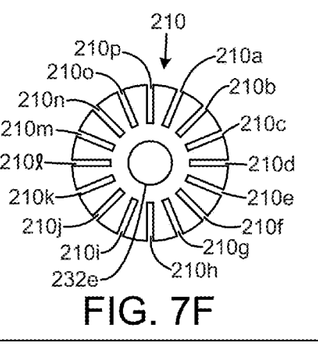
FIG. 7f is a top view of a horizontal disc of the present invention.
Figure 8:
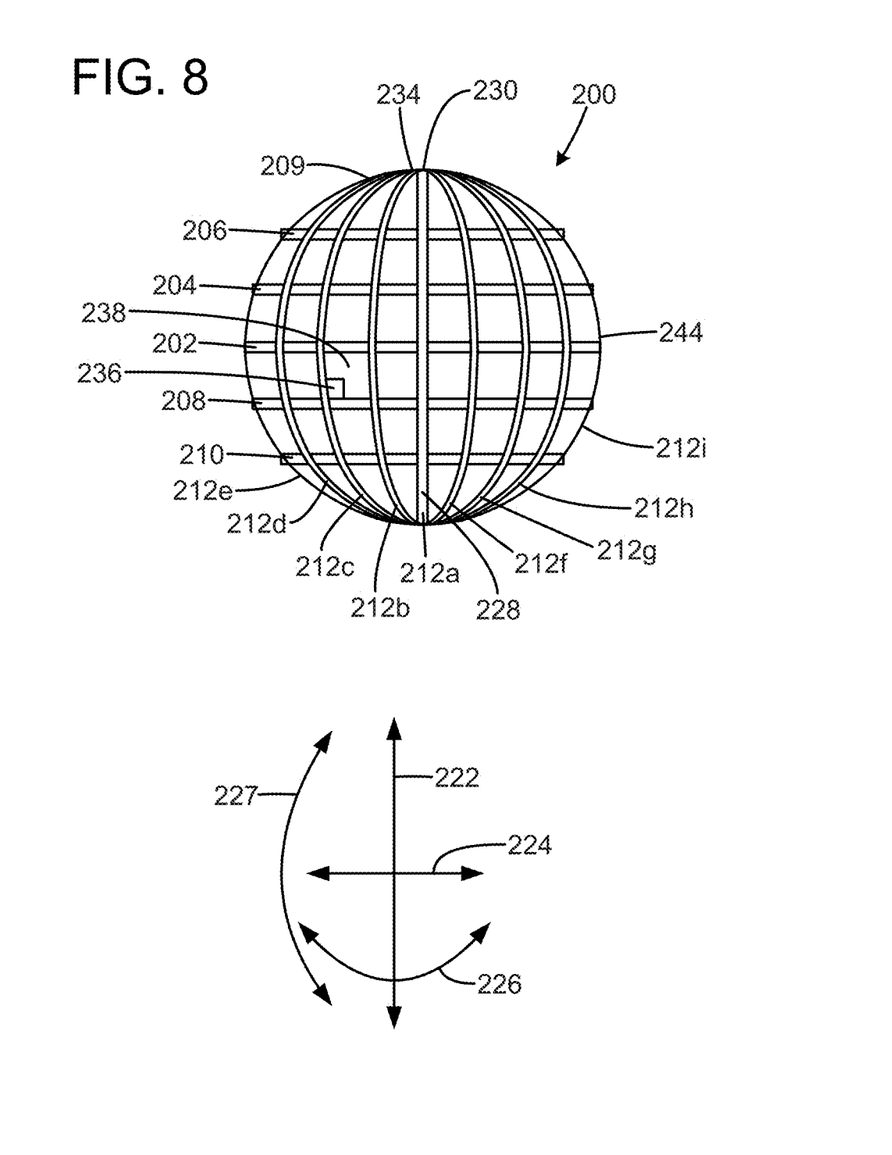
FIG. 8 is a side view of an assembled sphere of the present invention.

With reference to FIGS. 7-8, a sphere 200 may contain a plurality of discs such as horizontal discs 202, 204, 206, 208 and 210. The discs have different sizes in order to form the round shape of the sphere 200 when assembled. Preferably, discs 206 and 210 have the same size. Similarly, discs 204 and 208 have the same size while disc 202 has the largest diameter and form the "equator" of the sphere 200. More particularly, disc 202 has grooves 202a-202p, disc 204 has grooves 204a-204p, disc 206 has grooves 206a-206p, disc 208 has grooves 208a-208p, and disc 210 has grooves 210a-210p. The grooves are aligned so that vertical semi-circular insertions 212a-212p may be inserted into the aligned grooves 202a-202p, 204a-204p, 206a-206p, 208a-208p, 210a-210p to form the sphere 200 shown in FIG. 8.

A side view of insertion 212c is shown in FIG. 7A. Preferably, the insertions 212a, 212b and 212d-212p have identical shapes compared to the shape of insertion 212c. Only the color shades of the various insertions change but not the size or shape, as explained below. Insertion 212c has grooves c1, c2, c3, c4 and c5. The groove c1 is adapted to receive disc 206, groove c2 to receive disc 204, groove c3 to receive disc 202, groove c4 to receive disc 208 and groove c5 to receive disc 210. More particularly, insertion 212c is inserted into groove 202*j* of disc 202, groove 204*j* of disc 204, groove 206*j* of disc 206, groove 208*j* of disc 208 and groove 210*j* of disc 210. The other insertions are inserted into the grooves of the discs in a similar way until the sphere 200 is formed as shown in FIG. 8.

FIG. 8 only shows insertions 212*a*-212*i* but the insertions 212*j*-212*p* in the back of the sphere are identical to insertions 212*a*-212*i* except for the color shades. It should be understood that the exact number of discs and insertions used may vary and the embodiment shown in FIGS. 7-8 is only an illustrative example of an embodiment. Also, the exact shape of the discs and insertions may vary, although, when assembled, they always form a sphere.

Similar to sphere 100, the sphere 200 may have a peripheral surface 209 and all the visible colors are organized in an axial direction 222, a radial direction 224, a horizontal peripheral direction 226 and a vertical peripheral direction 227. In general, the color shades get lighter from a bottom 228 towards a top 230 of the sphere 200. The color shades with the greatest intensity are placed along a mid-segment 244 (the "equator") of the sphere 200. Colors match for instance when they are disposed along the axial direction 222, the radial direction 224, the horizontal peripheral direction 226 and the vertical peripheral direction 227 relative to one another. The sphere has a three-dimensional continuum of colors that may include an indefinite number of color cells so that the user may select suitable colors in any of the direction outlined above. If the user moves inwardly into the sphere the colors will include more grey and if the user moves upwardly or downwardly the colors will include more white or black, respectively.

It is also possible for the user to disassemble the sphere 200 to better see and compare color shades on each insertion and/or disc. For example, the user may simply pull out one of the insertions from the grooves to better see the color shades while the sphere 200 remains assembled or held together by the other discs and insertions.

It is also possible but not necessary to include round openings 232*a*, 232*b*, 232*c*, 232*d* and 232*e* in the discs 202-210, respectively so that a round axial opening 234 extends through the entire sphere 200 in the middle thereof. When so, it is important that the insertions 212*a*-212*p* are shaped so as not to extend into the axial opening 234 when the sphere 200 is assembled. The axial opening 234 permits light to go through the sphere 200 and makes it easier to see all the color shades with the same or similar light intensity regardless of where the color shade is located inside the sphere 200. The shape and size of the round opening 234 could be equivalent to the gray core 111 of the sphere 100. A "pillar" of the various greys, from white to black, could also be part of such an embodiment of sphere 200.

As mentioned above, the insertions 212*a*-212*p* have different color shades compared to one another. As shown earlier in, for example, FIG. 4, the color shades gradually vary or change from a red color shade for the insertion 212*c* inserted in, grooves 202*j*-210*j* and the insertions gradually change towards a bluish color shade of the insertion inserted into, grooves 202*o*-210*o* that in turn gradually change to a yellow color shade of the insertion 212*h* inserted into, grooves 202*d*-210*d*. As mentioned earlier, the color shade of each insertion also change from a dark or black color shade close to the bottom 228 to a light or white color shade close to the top 230 of the sphere. In other words, the change of the color shades is substantially similar to the change of color shades of the sphere 100 described in detail above.

One important advantage of the present invention is that the user may look inside the sphere 200 and easily see how the colors relate to one another even when the sphere 200 is fully assembled.

It is also possible to computerize the sphere in a computer program so that a digitalized version of the sphere can be viewed and turned in any way on a computer and/or a smart-phone app screen. The user can rotate the sphere, "dive" into the inside of the sphere (i.e. zoom into and out of) identify and have the name of any color and select colors that match. It may also be possible to select a color without matching the color with another color. The user may make color conversions between different color systems and may also save and email a selected color to another. The program may also include an information section with instructions about how the sphere and the color segments work and how to use the application of the computer program. It may also be possible to take a photo of a color segment use the computer system to match or identify the color segment among the color segments of the sphere. The computer program may also be used to determine if several colors taken by a camera match or not by identifying the colors among the color segments in the sphere and then determine if the identified color segments match one another.

In operation, the user may first select or identify a color cell in FIG. 8 such as a color cell 236 inside a pocket 238 of sphere 200. In order to find a matching color the user may for instance simply select any color in the radial direction 224, such as the color shade of color cell 239. In the horizontal peripheral direction 226, the user may select the color shade of color cell 240 on disc 208 and/or any color shade with a similar position on other insertions. In the vertical peripheral direction 227, the user may select the color shade of color cell 242 (see FIG. 7A). In this way, it is very easy for the user to see the relations between one color and other colors and select matching colors even if the colors are disposed far away from the selected color cell 236 in the sphere 200. As indicated above, since the sphere 200 includes a plurality of pockets such as pocket 238, the user can also easily select color shades inside the sphere 200 without having access to a virtual sphere that may be opened up by using a computer program.

Similar to FIG. 4 and as mentioned above, the color shades of each disc 202-210 gradually change in the clockwise direction from a blue color towards yellow and from yellow the color towards a red color and from the red color back towards the blue color. Each color shade is not shown in FIGS. 7A-7F for clarity. However, all the color shades of each color cell between these colors are disposed on each disc similar to the views shown in FIGS. 4-5. In other words, the relationship and logical continuum of color shades of disc 202 could be identical to the color shades shown in FIG. 4 and the only difference is that disc 202 has grooves to receive the insertions. The color shades of disc 210 are generally darker than the corresponding color shades on disc 208 that in turn are generally darker than discs 202, 204 and 206 as the color shades become gradually lighter towards the top 230 of the sphere 200. In this way, the sphere 200 provide an effective tool to easily select a color and identify other matching colors while also making it easier for the user to understand how colors related to another. The physical embodiment as well as the computerized version of the sphere may also be provided as a puzzle so that the user may use the sphere as a pedagogical tool to better understand the relationship between different color shades while assembling the puzzle. It can also be provided in simpler versions, such as a sphere that cannot be opened and/or in versions to be colored by the user herself.

Figure 9:
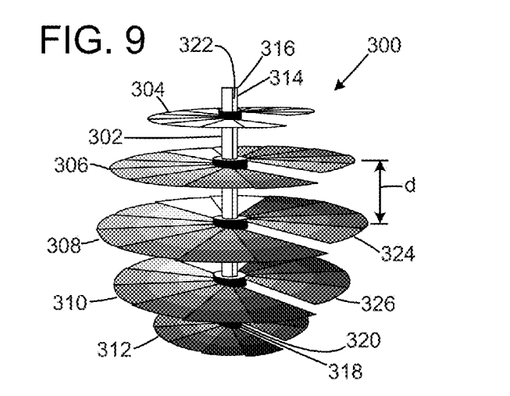
FIG. 9 is a perspective view of an embodiment of a color device of the present invention.
Figures 10, 11:
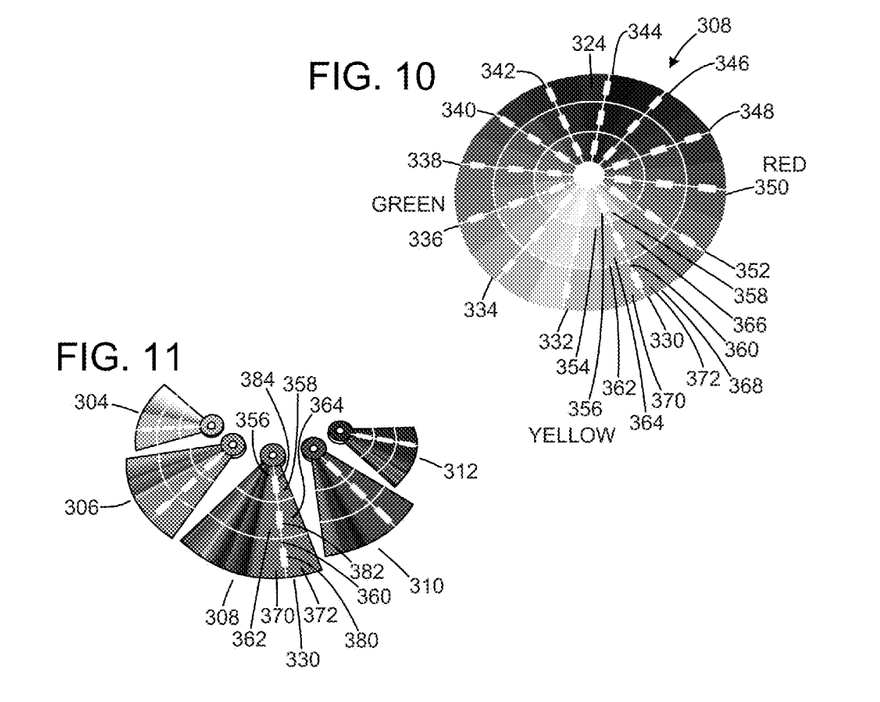
FIG. 10 is a top view of a fully expanded disc.
FIG. 11 is a top view of partially expanded discs including pie-shaped slidable pieces.

FIG. 9 is a perspective view of a color device 300. The features and principles that apply to the color spheres 100 and 200, described above, also apply to color device 300 and are therefore not repeated. The color device 300 has a central core 302 and expandable, contractible and/or foldable discs 304, 306, 308, 310 and 312 attached to the core 302 with, for example, a suitable fastener. The discs extend perpendicularly to and outwardly from the core 302. The discs may have pie-shaped and slidable pieces so that the discs may be expanded like a fan (best shown in FIGS. 10-11) and contractible like a collapsed fan. FIG. 11 shows partially expanded or contracted discs 304-312. The discs may be attached to the core without a fastener also, by, for example, sliding the disc onto the core via an opening defined at one end of each disc. Preferably, the discs extend perpendicularly to and radially outwardly from the core 302. Preferably, the distance (d) is the same or about the same between each disc. This means the inner most color cells located adjacent to the core 302 may also be visible without first having to remove the disc placed above. Preferably, each disc includes the entire color spectrum but at different whiteness, as explained below, since the whiteness of the discs gradually increases towards the top of the color device.

FIG. 9 shows five discs but the present invention may have more or fewer discs attached to the core. Preferably, the discs can be placed along the core 302 so that they together form a spherical-shape. However, the invention is not limited to spherical-shapes. Other shapes such as oval, rectangular, square, triangular shapes are also possible.

The color shades of the core 302 are organized so that they gradually change whiteness from white 314 at a top 316 to black 318 at the bottom 320 of the core 302. The reverse organization is also possible i.e. that color shades gradually change whiteness from a black shade at the top to a white shade at the bottom of the core. The core 302 may have a groove 322 defined therein for guiding the discs 304-312 so that the discs may easily be aligned and so that color shades of different discs match in an axial direction parallel to the core 302. The discs may be removed from the core 302 by sliding them off the core 302 and placed on the core 302 by sliding them onto the core 302. The core 302 may have a cylindrical or conical shape so that the diameter is smaller at the top compared to the bottom of the core. The core 302 may also be conical while including steps to support each disc. Other suitable fastening mechanisms may also be used such as clamping the discs to the core or hanging the discs on the core with hooks. Preferably, the discs are aligned so that the hues are the same on each disc compared to one another in the vertical or axial direction along the core except for the fact that the whiteness of the discs differs. One important feature of the present invention is that the most cromatic or most intense hues are located at the "equator" of the sphere.

In general, the whiteness of the hues on each disc matches the whiteness of the hue on the core 302. This means the whiteness of the color cell on core 302 at which a disc is attached is identical to the whiteness of the hues on that particular disc. For example, the color cell 324 on disc 308 has a hue that is identical to a hue of corresponding color cell 326 on disc 310, because they are vertically or axially aligned so that cell 324 is positioned straight above cell 326, with the only difference that the whiteness become gradually dominant towards the top 316 so that, for example, the color cell 324 is slightly whiter than color cell 326 on disc 310 below disc 308. As indicated above, an important feature of the present invention is that the hues and placement of each color cell are identical between each disc and the only difference is that the hues of the discs become whiter from the bottom towards the top of the core. Another important feature of the present invention is that the level of color saturation in each color shade is gradually increased as color cells are positioned away from the radially inner position adjacent to the core 302 in a perpendicular direction to the periphery of the disc. This means the hue at the periphery is more pure and includes no or virtually no amount neutral gray while the hue immediately adjacent to the core includes a substantial amount gray since the color saturation of the hues adjacent to the core is very low. In other words, the most pure colors are preferably located at the periphery of the sphere.

FIG. 10 shows the fully expanded disc 308. Disc 308 is used as an illustrative example and the same principles apply to discs 304, 306, 310 and 312. Preferably, each pie-shaped piece has width so that when each piece is placed next to one another, they together form a 360 degree disc. As mentioned above, the disc 308 includes the entire color spectrum but at a specific whiteness that matches the whiteness of the color cell of the core 302 at which the disc 308 is attached. This applies to discs 304, 306, 310 and 312 also. For example, the disc 308 may have bluish color cells or hues at 12 o'clock and the hues gradually change to a reddish color at 4 o'clock. The hues gradually change to a yellowish color at 6 o'clock and then to a greenish color at 8 o'clock. FIG. 10 is marked Blue, Red, and Green to illustrate this and each of these hues are positioned 120 degrees apart.

The disc 308 has a plurality of pie-shaped pieces 330-352 that may be slid over one another as the expanded is contracted, like a fan, by sliding piece 330 over piece 332 that, in turn, is slid over piece 334 and so on until only piece 330 shows and all the other pieces are placed below piece 330 with piece 352 being at the bottom. It is also possible to rotate one piece away from the pack of pieces so that the viewer can more easily see the color shapes on that rotated piece.

Each piece has a number of color bands and a central radially directed color code line. Each color band includes color cells which have the same distance to the core and each color cell has a consistent hue. All the hues within a color band have the same level of color saturation. All the hues within a color band have the same whiteness also since they are all on the same disc.

FIG. 10 is an illustrative example that shows three bands, but more or fewer color bands may be used. For example, piece 330 has an inner band 354 with two hues 356, 358 on each side of color code line 360 and a middle band 362 with two hues 364, 366 on each side of line 360 and an outer band 368 with two hues 370 and 372 on each side of line 360. As indicated earlier, the whiteness of each hue on disc 308 is the same but the level of color saturation is gradually increased so that, for example, hue 370 contains no gray while hue 356 contains a lot of gray and could be almost completely gray when a large number of bands are used on each piece.

With reference to FIG. 11, piece 330 of disc 308 has code sections 380, 382 and 384. Disc 308 is here used as an illustrative example and all other discs and pieces can be constructed in the same or similar way. Code section 380 may provide a color code for hue 370 and another color code for hue 372. Similarly, code section 382 may provide a first color code for hue 364 and another code for hue 366 while code section 384 may provide a color code for hue 356 and another code for hue 358. Preferably, the codes in each code section are turned so that it is apparent which hue it refers to. One advantage of having line 360 in the middle of piece 330 instead of at the edge thereof is that it makes it possible to place the pie-shaped piece 330 next to another pie-shaped piece or a background color and compare colors without the line 360 coming in between the two pieces so that when the sides of each piece are be placed immediately adjacent to one another the hues are placed immediately adjacent to one another also. The fact that line 360 is not placed along the edge of the piece also makes it easier to compare the hue of the piece with another hue placed below the piece to determine whether to two hues match and look good together.

In operation, the user may first select the whiteness by selecting a disc, such as disc 308, from color device 300. Disc 308 may be removed from core 302 by first sliding off discs 304 and 306. Other ways of removing the discs are also possible depending upon which fastening mechanism is used. The user may then select a pie-shaped piece, such as piece 336, by sliding or rotating pieces 330-334 and 338-352 so that they, for example, point in the opposite direction compared to piece 336. The important thing is that piece 336 is free so that the user can compare the hues of piece 336 with another hue or other hues. More particularly, the user may thus select a hue on piece 336 and compare this selected hue with a background color or with a hue of a slidable piece from a different disc. Because the discs 304-312 are aligned by groove 322, the user knows that colors match vertically or axially. The colors also match radially inwardly or outwardly on the same piece since the whiteness of the hues are the same and only the color saturation is increased from the core 302 towards the periphery of the disc. Colors also match that are on the same circular band i.e. hues on the same disc that are at the same distance from the core 302 match one another because they contain the same level of color saturation.

Each disc may also include hues on the underside of each disc. These hues may be identical to the hues on the upper-side or different from the hues on the upper-side. Another advantage of the foldable pieces is that they can be made very compact when folded which saves space and it is possible to slide out only selected pieces when it is time to compare hues.

The present invention also relate to a color navigator. In most software tools where the user need to pick a color for applying it to a text, a line or a figure, the color is either selected from a flat two-dimensional palette, or by entering a code (e.g. a RGB value). If a palette is used, it is often hard to understand how the colors differ in hue, saturation and whiteness. If codes are instead used to specify a color, it is often necessary to have expertise in how colors are related to one another. Most users do not have this expertise.

By using a software version of the earlier mentioned color sphere, possibly as a plug-in color navigator, the user is able to select a desired color by twisting and turning the color sphere until the appropriate hue and whiteness is shown. If less, or more, saturation of the color is required, this may be accomplished by moving into, or out from, the center of the sphere until the correct saturation layer is reached and the desired color cell is selected by the user. The various movements of the color sphere could be controlled by e.g. a mouse, finger movements on a touchscreen, or similar technique. One important advantage of this embodiment is that a non-expert user can select a desired color from a wide range of hues, with different whiteness and saturation in a very intuitive and logical way because the colors are organized in a way that makes it easy for the user to navigate inside and outside the color sphere.

While the present invention has been described in accordance with preferred compositions and embodiments, it is to be understood that certain substitutions and alterations may be made thereto without departing from the spirit and scope of the following claims.

The invention claimed is:

1. A color device, comprising,
a core having hues that gradually change whiteness from a black color shade at a first end to a white color shade at second end,
a first disc attached to a first position of the core having a first level of whiteness, the first disc having hues covering an entire color spectrum at the first level of whiteness,
a second disc attached to a second position of the core having a second level of whiteness, the second disc having hues covering an entire color spectrum at the second level of whiteness;
the first disc and the second disc extending perpendicularly outwardly from the core, the first disc being axially remote from the second disc so that a distance (d) is formed therebetween,
the first disc and the second disc being aligned so that color cells of the first disc axially aligned with color cells of the second disc having identical hues,
the first disc and the second disc having the color cells arranged so that a level of color saturation in the color cells is gradually increased radially outwardly from the core,
the first disc has a plurality of pie-shaped pieces, the pie-shaped pieces being slidable relative to one another;
a third disc placed between the first disc and the second disc at an equator position of the color device, the third disc having a plurality of slidable pie-shaped pieces, the third disc having most intense or most chromatic hues placed at a periphery of the third disc;
the slidable pie-shaped pieces of the third disc each having a radially directed color code line in a middle of the pie-shaped pieces, a first pie-shaped piece of the third disc having a first color code line and a second pie-shaped piece of the third disc having a second color code line, the first pie-shaped piece being placeable next to the second pie-shaped piece without the first or second color code lines coming in between the first and second pie-shaped pieces so that hues of the first pie-shaped piece are immediately adjacent to hues of the second pie-shaped piece,
the color cells of the first, second and third discs being visible when the first, second and third discs are attached to the core; and
each first, second and third disc being removable from the core.

2. The color device according to claim 1, wherein each color cells has a consistent level of color saturation within the color cell.

3. The color device according to claim 1, wherein each color cell has a consistent whiteness within the color cell.

4. The color device according to claim 1, wherein the color device has a third disc attached to the core, the first, second and third discs together forming a spherical shape.

5. The color device according to claim 1, wherein the pie-shaped pieces form a circle-shaped disc when the pie-shaped pieces are placed adjacent one another.

6. The color device according to claim 1, wherein each disc has circular bands of hues, each color shade in a peripheral band has an identical level of color saturation content.

* * * * *